May 10, 1949.  D. C. ROBSON  2,469,993
LOCKING DEVICE
Filed April 12, 1946
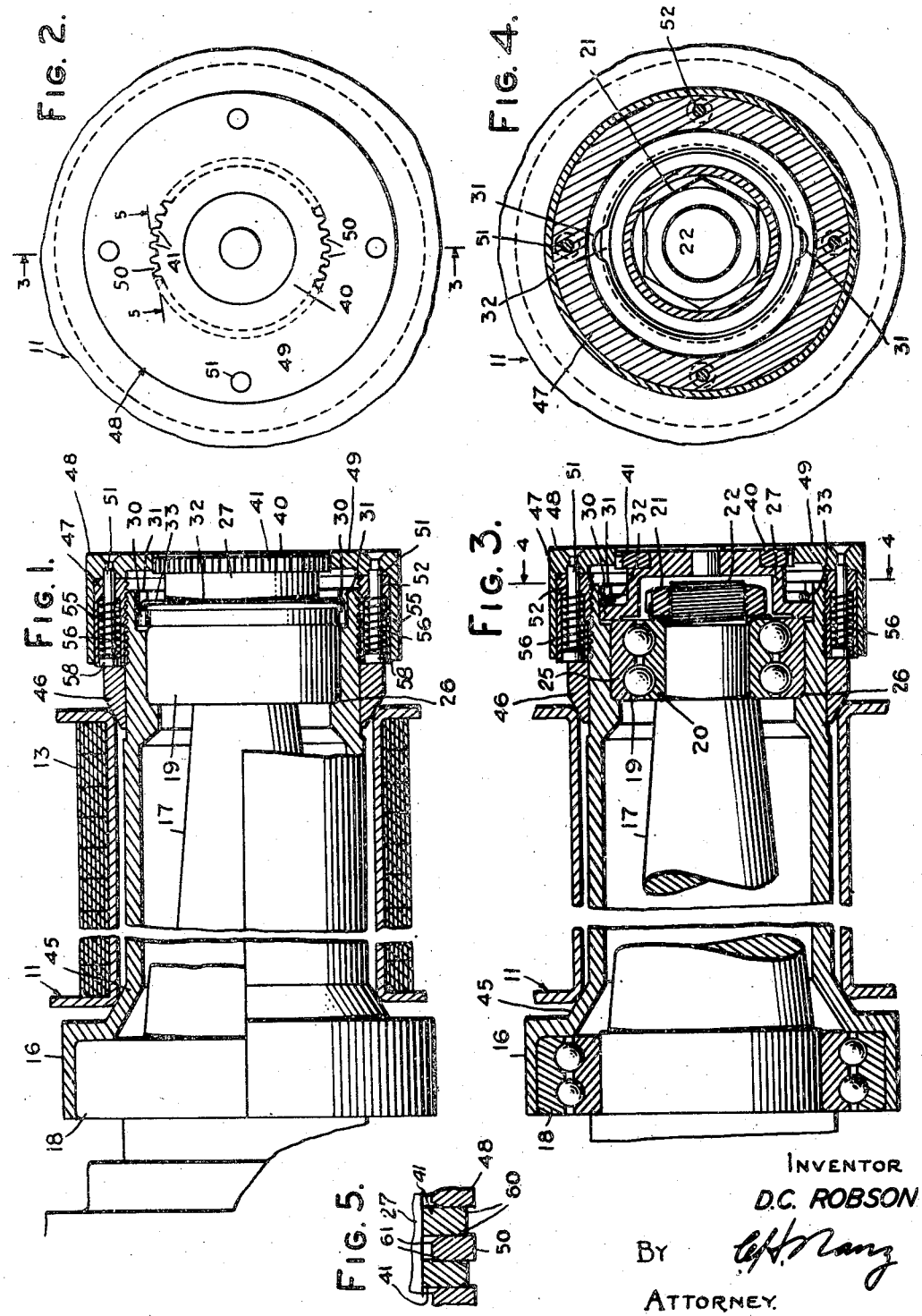
INVENTOR
D.C. ROBSON
BY
ATTORNEY.

Patented May 10, 1949

2,469,993

UNITED STATES PATENT OFFICE 2,469,993

LOCKING DEVICE

Duer C. Robson, Baltimore, Md., assignor to Western Electric Company, Incorporated, New York, N. Y., a corporation of New York Application April 12, 1946, Serial No. 661,745

4 Claims. (Cl. 242—68)

1

This invention relates to locking devices, and more particularly to devices for locking reel-securing nuts on rotatable arbors.

In the manufacture of a coaxial cable, tape is sometimes drawn at high speed from reels mounted on rotatable arbors of a serving head, and is wound around a core unit of such a cable. In the past, if the reels and arbors have been rotated in the same direction as that in which the locking nuts may be unscrewed from the arbors, the locking nuts sometimes come off of the arbors. When the arbors are revolved rapidly, the nut might fly off of the arbor thereby creating a hazard for an operator of the apparatus.

An object of the invention is to provide new and improved locking devices.

Another object of the invention is to provide a device for locking a reel retaining nut on a rotating member in a fashion in which the nut will be positively locked to the rotating member even if the rotating member is rotated in a direction tending to unscrew the nut from the rotating member.

A locking apparatus illustrative of the invention includes a nut designed to be threaded upon a tapped end of a reel supporting arbor to secure a reel on the arbor. An annular disc having radially projecting teeth on the outer periphery thereof is fastened rigidly to the arbor. A cap which fits slidably over the annular member has an inwardly projecting flange on which are formed radially projecting teeth complementary to the teeth on the annular disc, and a plurality of springs mounted in sockets formed in the nut urge the cap into interlocking relationship with respect to the disc. Hence, when the arbor is rotated, teeth on the disc positively engage the cap, which is held against rotative movement relative to the nut, so that the nut is held against rotation relative to the arbor.

A complete understanding of the invention may be obtained from the following detailed description of a locking device forming a specific embodiment thereof, when read in conjunction with the appended drawings, in which:

Fig. 1 is a fragmentary, partially sectional view of an apparatus including a locking device forming one embodiment of the invention;

Fig. 2 is a front elevation of the locking device;

Fig. 3 is a fragmentary, vertical section taken along line 3—3 of Fig. 2;

Fig. 4 is a fragmentary, vertical section taken along line 4—4 of Fig. 3, and

2

Fig. 5 is an enlarged, fragmentary section taken along line 5—5 of Fig. 2.

Referring now in detail to the drawings, a serving head revolves a reel 11 (Fig. 1) having a supply of tape 13 thereon to wrap the tape around a core unit (not shown) as the core unit is advanced relative to the serving head. As the tape 13 is drawn from the reel 11, it rotates the reel on the serving head. The reel is mounted on a reel-supporting arbor 16, which is rotatably mounted on a non-rotatable shaft 17 by thrust bearings 18 and 19. An inner race 20 (Fig. 3) of the bearing 19 is secured on the end of the shaft 17 by a lock nut 21 threaded on a threaded end portion 22 of the shaft. An outer race 25 of the thrust bearing 19 is locked by a mounting ring 27 in a socket 26 formed in the arbor. The mounting ring 27 is provided with ears 30—30 which fit into complementary recesses 31—31 (Fig. 4) formed in the reel supporting arbor to prevent relative rotation of the mounting ring with respect to the arbor. A snap ring 32 (Fig. 3) fits into an annular groove 33 formed in the end of the arbor, and secures the mounting ring against axial movement with respect to the arbor. An annular disc 40 having closely spaced, outwardly projecting radial teeth 41—41 (Fig. 2) formed thereon is integrally secured to the mounting ring.

The reel 11 is secured on the reel-supporting arbor 16 between a wedge portion 45 (Figs. 1 and 3) formed on the arbor and an annular wedge 46, which is slidable on the outer end of the arbor. The wedge 46 is held against the reel by a nut 47 which is threaded over the outer end of the arbor. A knurled cap 48 fits slidably over the nut 47, and has an inwardly projecting flange 49, on which are formed teeth 50—50 (Fig. 2) projecting radially inwardly and which are complementary to the teeth 41—41 formed on the disc 40. Pins 51—51 (Fig. 1) fastened rigidly to the cap are mounted slidably in bores 52—52 formed in the nut, and counterbores 55—55 formed in the nut receive compression springs 56—56, which engage heads 58—58 of the pins and urge the pins to the left, as viewed in Fig. 1. This urges the cap to a position against the nut, in which position the teeth 50—50 of the cap 48 engage the teeth 41—41 of the disc. Thus, when the arbor 16 is rotated by the reel 11, the nut 47 is held positively against rotation relative to the arbor, and the force exerted on the teeth 50—50 of the cap by the teeth 41—41 of the disc 40 does not tend to force the teeth 50—50 out of engagement with the teeth 41—41 so that the nut 47 cannot accidentally unscrew from the arbor during the operation.

When the nut 47 is threaded either onto or off of the arbor 16, the cap 48 is held away from the nut 47 by an operator and the compression springs 56—56 (Fig. 3) are compressed so that the teeth 50—50 on the flange 49 of the cap 48 completely clear the teeth 41—41 on the disc 40. Thus the nut 47 may be freely threaded onto or off of the arbor 16, and when it is in the desired position, the cap 48 is released in a position in which the teeth 50—50 thereof mesh with the teeth 41—41 on the disc 40. Bevelled edges 60—60 (Fig. 5) and 61—61 of the teeth 41—41 and 50—50, respectively, enable the teeth 41—41 and 50—50 to mesh freely. The number of teeth on each of the disc 40 (Fig. 2) and the cap 48 is large so that fine adjustments of the nut 48 may be made with respect to the reel supporting arbor 49.

The teeth 41—41 and 50—50 are quite thick so that large portions of each are in engagement with the other over a relatively wide range of settings of the nut 47 with respect to the arbor 16. This plus the fact that the faces of all the teeth are in planes parallel to the axis of rotation of the arbor prevent any disengagement of the teeth 50—50 with respect to the teeth 41—41 from camming action between the two sets of teeth. If the teeth 41—41 or 50—50 become worn, the mounting ring 27 or the cap 48 may be replaced by an element identical therewith without the necessity of replacing any of the rest of the structure.

What is claimed is:

1. A device for mounting a reel, which comprises an arbor having a threaded end thereon and also being provided with an interlockable socket, a nut designed to be screwed on the threaded end of the arbor to secure a reel on the arbor, a locking ring having a portion complementary to the interlocking socket for fitting into the socket and also being provided with a plurality of radially disposed outwardly projecting teeth, means for securing the complementary portion of the locking ring in said interlocking socket to fasten the locking ring against rotating and axial movement relative to the arbor, a cap having a plurality of radially disposed inwardly projecting teeth complementary to the teeth formed on the locking ring for fitting slidably over the nut, and means for urging the cap over the nut to hold the teeth on the cap in interlocking engagement with the teeth on the locking ring.

2. A device for mounting a reel, which comprises an arbor having a threaded end thereon and also being provided with an interlockable socket, a nut designed to be screwed on the threaded end of the arbor to secure a reel on the arbor, a locking ring having a portion complementary to the interlocking socket for fitting into the said socket and being provided with a radially pointing detent, means for securing the complementary portion of the locking ring in said interlocking socket to fasten the locking ring to the arbor against rotating and axial movement relative to the arbor, a cap having a socket for receiving the detent for fitting slidably over the nut, and means for urging the cap over the nut to hold the socket in the cap in interlocking engagement with the detent on the locking ring.

3. A device for mounting a reel, which comprises an arbor having a threaded end thereon and also being provided with an interlockable socket, a nut designed to be screwed on the threaded end of the arbor to secure a reel on the arbor, a locking ring having a portion complementary to the interlocking socket for fitting into the said socket and provided with a radially inwardly projecting indentation, means for securing the complementary portion of the locking ring in said interlocking socket in the arbor to fasten the locking ring against rotating and axial movement relative to the arbor, a cap having a radially disposed inwardly projecting detent complementary to the indentation formed in the locking ring for fitting slidably over the nut, and means for urging the cap over the nut to hold the detent on the cap in interlocking engagement with the indentation in the locking ring.

4. A device for mounting a reel, which comprises a shaft, an arbor mounted rotatably on the shaft for supporting a reel, said arbor also being provided with a tapered abutment on one end and being threaded on the other end, a wedge ring mounted slidably on the arbor for holding a reel against the abutment on the arbor, a nut designed to be screwed on the threaded end of the arbor for holding the wedge ring against the reel, said nut having a plurality of bores formed therein in positions in which the bores are parallel with the longitudinal axis of the nut, a cap slidably mounted on the nut and provided with an inwardly projecting flange and thick radial teeth projecting inwardly therefrom, a plurality of pins projecting through the bores formed in the nut and secured to the cap, a plurality of springs for urging the cap upon the nut, a locking ring having a plurality of thick radially disposed teeth complementary to the radially disposed teeth on the flange of the cap for interlocking with the teeth on the flange to prevent relative movement between the locking pin and the cap, said rotatable arbor being provided with a non-cylindrical socket, said locking ring having a portion complementary in shape to the socket in the arbor for fitting into the socket for preventing relative rotation therebetween, and means for holding the locking ring against axial movement relative to the arbor.

DUER C. ROBSON.

REFERENCES CITED

The following references are of record in the file of this patent:

UNITED STATES PATENTS

| Number | Name | Date |
| --- | --- | --- |
| 216,666 | Fay | June 17, 1879 |
| 738,060 | Parsons | Sept. 1, 1903 |
| 739,716 | Reid | Sept. 22, 1903 |
| 1,030,146 | Wade | June 18, 1912 |
| 1,815,264 | Larsen | July 21, 1913 |